(12) United States Patent
Lin

(10) Patent No.: US 9,776,048 B2
(45) Date of Patent: Oct. 3, 2017

(54) LIGHT RELEASING SPHERE STRUCTURE

(71) Applicant: Wei-Hung Lin, New Taipei (TW)

(72) Inventor: Wei-Hung Lin, New Taipei (TW)

(*) Notice: Subject to any disclaimer, the term of this patent is extended or adjusted under 35 U.S.C. 154(b) by 226 days.

(21) Appl. No.: 14/716,778

(22) Filed: May 19, 2015

(65) Prior Publication Data
US 2016/0271458 A1    Sep. 22, 2016

(30) Foreign Application Priority Data
Mar. 18, 2015   (TW) ............................. 104204036 U

(51) Int. Cl.
| | |
|---|---|
| F21V 7/04 | (2006.01) |
| H01L 33/00 | (2010.01) |
| A63B 43/06 | (2006.01) |
| F21V 33/00 | (2006.01) |
| F21V 8/00 | (2006.01) |
| F21W 131/40 | (2006.01) |
| A63B 69/00 | (2006.01) |
| A63B 102/18 | (2015.01) |
| F21Y 115/10 | (2016.01) |

(52) U.S. Cl.
CPC ............ *A63B 43/06* (2013.01); *F21V 33/008* (2013.01); *G02B 6/0096* (2013.01); *A63B 2069/0004* (2013.01); *A63B 2102/18* (2015.10); *A63B 2207/02* (2013.01); *F21W 2131/40* (2013.01); *F21Y 2115/10* (2016.08)

(58) Field of Classification Search
CPC .............................. F21V 33/008; A63B 43/06
See application file for complete search history.

(56) References Cited

U.S. PATENT DOCUMENTS

| | | | |
|---|---|---|---|
| 5,080,359 A * | 1/1992 | Thill ..................... | A63B 43/008 273/DIG. 24 |
| 5,403,000 A * | 4/1995 | Woosley ............... | A63B 43/06 273/DIG. 24 |
| 5,779,574 A * | 7/1998 | Allman .................. | A63B 43/06 473/570 |
| 5,888,156 A * | 3/1999 | Cmiel .................... | A63B 43/06 473/570 |
| 2007/0021244 A1* | 1/2007 | Ko ......................... | A63B 43/06 473/570 |
| 2014/0308875 A1* | 10/2014 | Renforth ................ | A63H 33/26 446/485 |

* cited by examiner

*Primary Examiner* — Alexander Garlen
(74) *Attorney, Agent, or Firm* — Li & Cai Intellectual Property (USA) Office

(57) ABSTRACT

A modified sphere structure including: a sphere body with a groove formed on a surface of the sphere body along a distribution path; a light source module disposed in a containing space of the sphere body, wherein the groove is connected to the containing space to define a light releasing space and light emitted from the light source passes through the light releasing space; and a light guiding member filling to the light releasing space to allow the light emitted from the light source to be distributed on the light guiding member along the distribution path and transmitted to outside of the sphere body.

16 Claims, 17 Drawing Sheets

LIGHT RELEASING SPHERE STRUCTURE

BACKGROUND OF THE INVENTION

1. Field of the Invention

The present disclosure relates to a modified sphere structure; in particular, a sphere structure having a light source module disposed therein, so as to allow the light emitted from the light source module to pass through a light releasing space of a groove and reach the outside surroundings of the sphere structure.

2. Description of Related Art

In order to let ball sports be able to undergo at night or in a dark environment, a light source of brightness is used to light up the place for sport. Thus, people can enjoy ball sports at night with sufficient light supplied without being restricted to the busy daytime having to bear the burning sun above the head when participating in the sports. However, utilization of an external light source to provide sufficient light to the sport field is not good for environment protection and also not cost saving.

To solve the above-mentioned problems, some commercialized products capable of emitting light from the ball body itself have been released to the market. However, these ball products mostly merely have some illuminating decorations or fluorescence elements simply disposed on the surface of the ball body and have no anti-collision mechanism formed thereon. When a collision occurs, damages and failures to the ball result and such balls can only be applied for being play things, instead of being applied for practicing or throwing with heavy strength. Even if such ball products were made with hit-improved efforts, they are basically made with a complex structure, resulting in manufacturing difficulties and costs.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

The object of the present disclosure is to provide a modified sphere structure comprising: a sphere body with a groove formed on a surface of the sphere body along a distribution path; a light source module disposed in a containing space, wherein the groove is connected to the containing space to define a light releasing space and light emitted from the light source passes through the light releasing space; and a light guiding member filling to the light releasing space to allow the light emitted from the light source to be distributed on the light guiding member along the distribution path and transmitted to outside of the sphere body.

In sum, it is known that the modified sphere structure has the containing space interconnecting with the light releasing space of the groove, allowing the light source module to be safely disposed within the sphere to avoid the overpower of a hit and the light releasing space and the light guiding member in the light releasing space can guide light coming from the light source that passes through the light releasing space and evenly lead the light to the whole groove and further to the outside of the sphere from the groove. Damaging impact can be prevented, and light transmission to the outside of the sphere can be ensured without dragging the illumination effect. The structure of the above-mentioned containing space and light interconnected to the releasing space of the groove allows the assembling of the light guiding module to be easier, the complexity of manufacturing to be prevented and the unnecessary costs to be deceased.

In order to further the understanding regarding the present disclosure, the following embodiments are provided along with illustrations to facilitate the disclosure of the present disclosure.

DETAILED DESCRIPTION OF THE PREFERRED EMBODIMENTS

First Embodiment

Figure 1A:
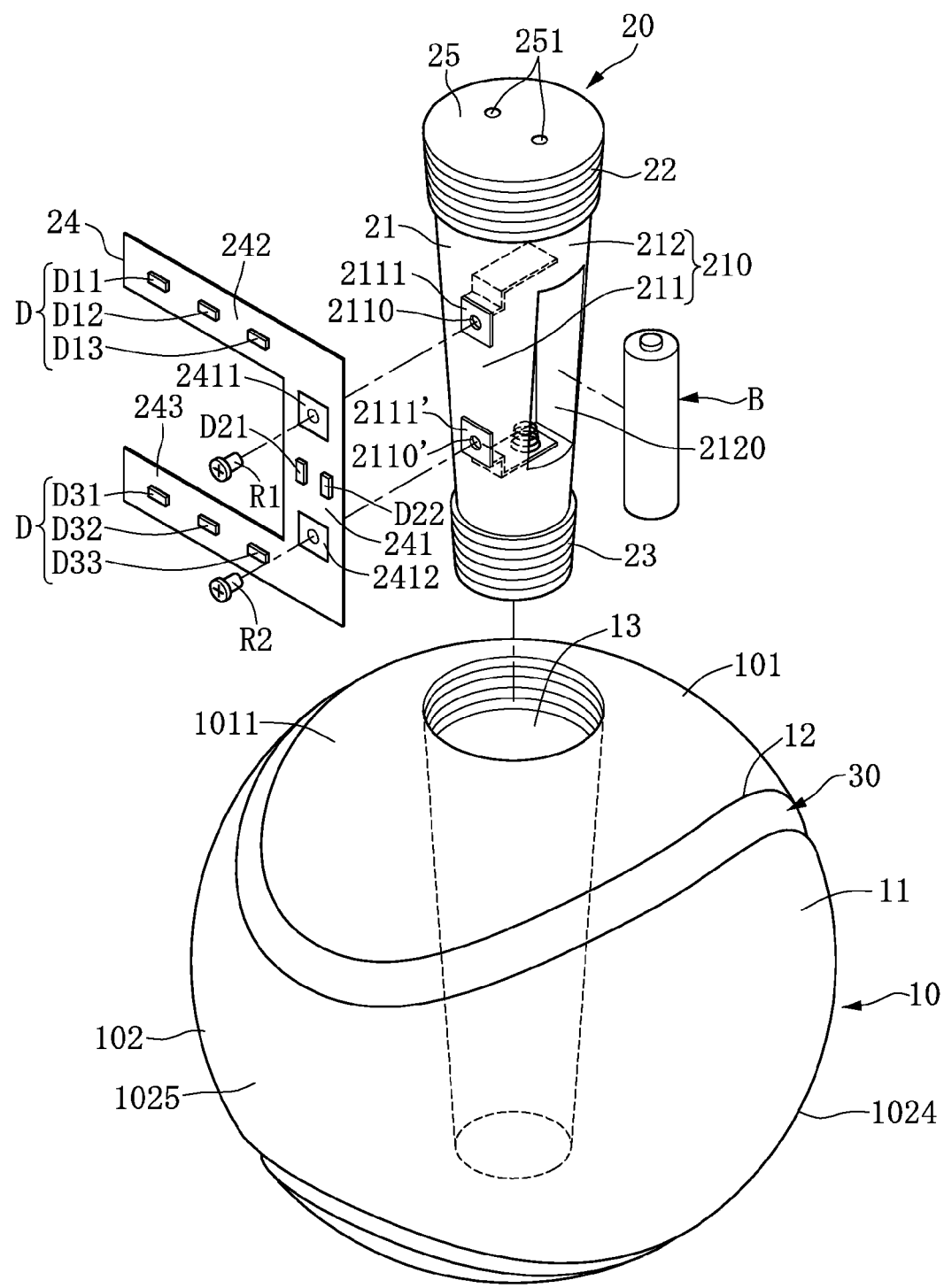
FIG. 1A shows an exploded view of the modified sphere structure according to the first embodiment of the present disclosure.
Figure 1B:
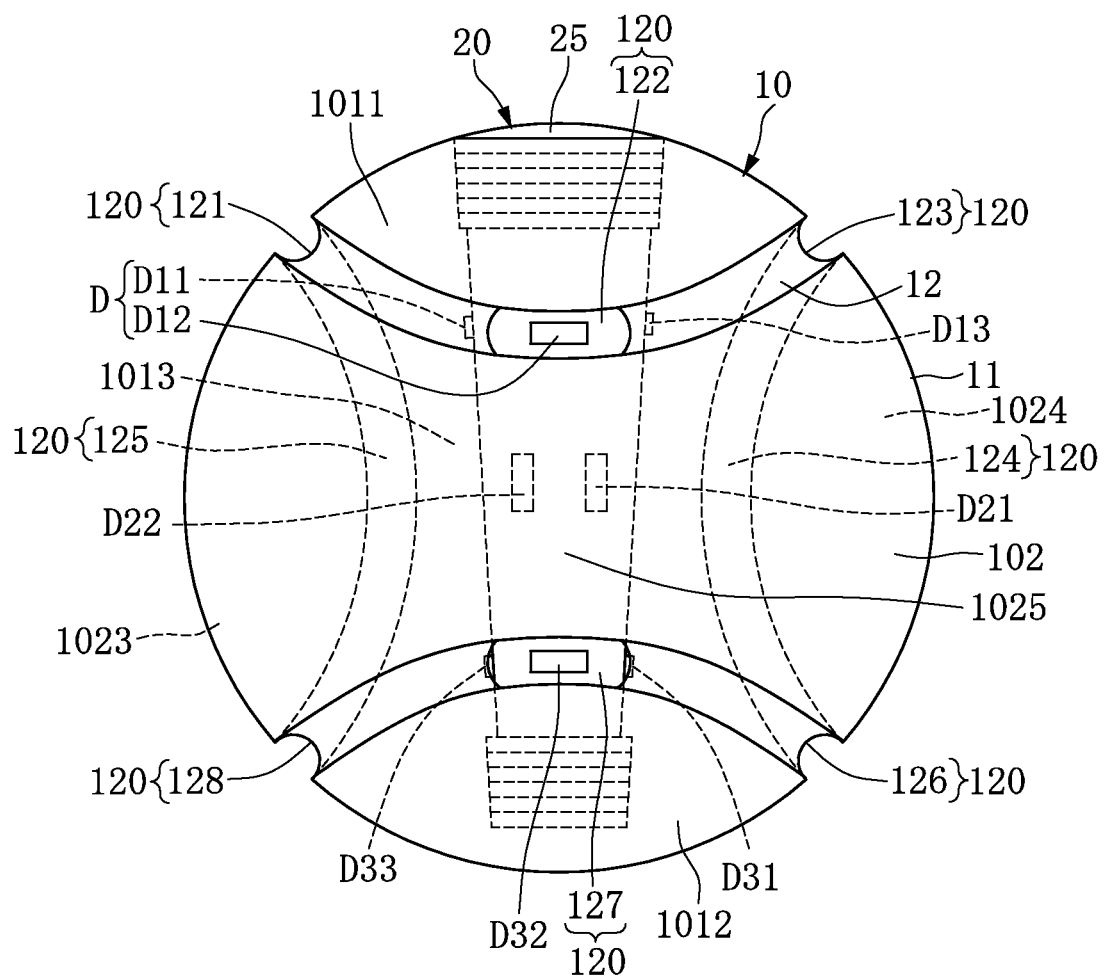
FIG. 1B shows a perspective view of the modified sphere structure according to first embodiment of the present disclosure.
Figure 1C:
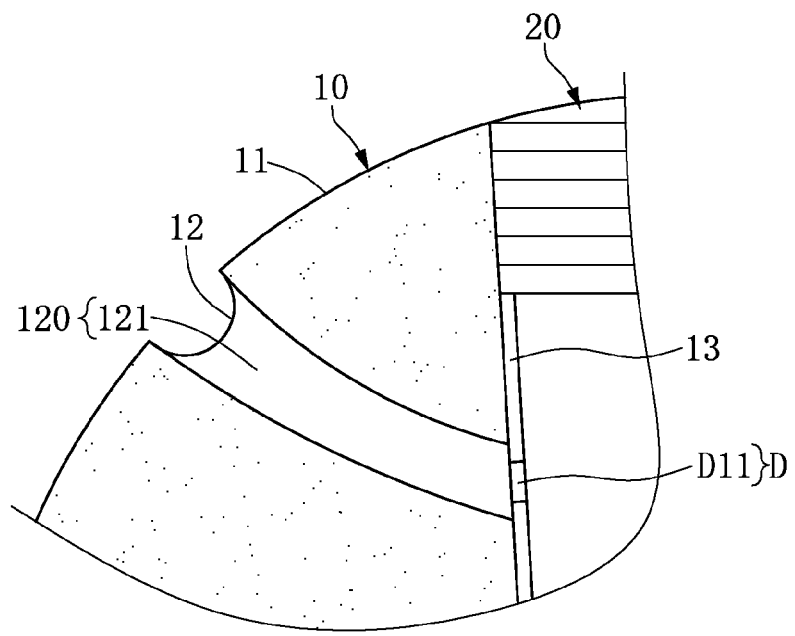
FIG. 1C shows a cross-sectional view of the modified sphere structure according to the first embodiment of the present disclosure.
Figure 1D:
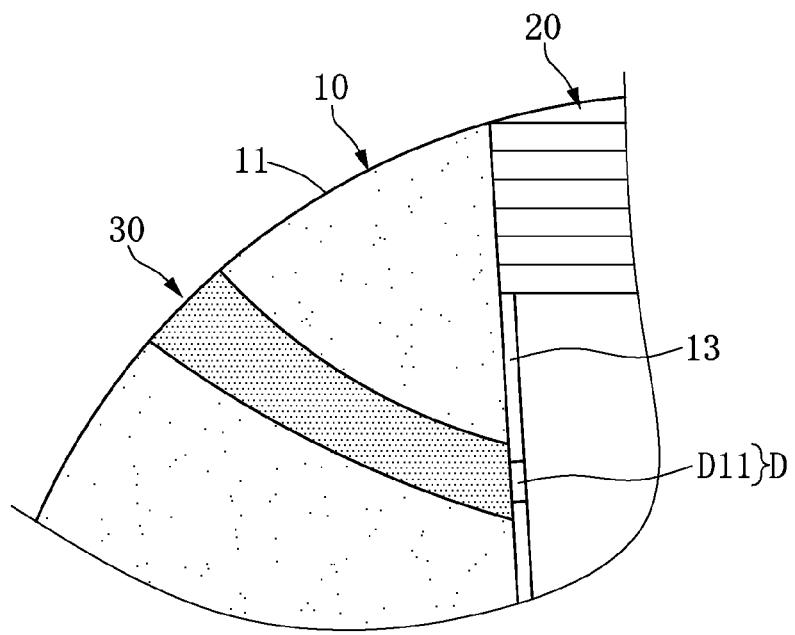
FIG. 1D shows a cross-sectional view of the light releasing space assembled with a light guiding member according to the modified sphere structure of the first embodiment of the present disclosure.

Please refer to FIGS. 1A and 1B. The present disclosure provides a modified sphere structure including: a sphere body 10, a light source module 20 and a light guiding member 30. A groove 12 is formed on the surface 11 of the sphere body 10 along a distribution path (label not shown). The light source module 20 is disposed in a containing space 13 formed from the surface 11 of the sphere body 10 to the inside of the sphere body 10. Please refer to FIG. 1C. The FIG. 1C is a schematic diagram of cross-section view of the first upper light emitting diode D11, an example, illustrated in the FIG. 1B. The groove 12 is connected to the containing space 13 to together define a light releasing space 120. The light releasing space 120 receives the light emitted from the light emitting diodes D of the light source module 20. Please refer to FIGS. 1A, 1C and 1D. The light guiding member 30 fills in the light releasing space 120 or even the whole groove 12. Thus, the light emitted from the light emitting diodes D of the light source module 20 can be evenly guided to the light guiding member 30 along the distribution path and further transmitted to the outside of the sphere 10. Also, because of the existence of the light guiding member 30, the visual effect of even light distributing along the distribution path on the surface of the sphere body 10 can be achieved and the sphere body 10 can represent a good recognizable illuminating effect in dark places.

Please refer to FIGS. 1A and 1B. The aforementioned distribution path can be a distribution path of a baseball seam line. A first spherical surface 101 and a second spherical surface 102 are formed by the division of the distribution path of baseball seam line to the surface 11 of the sphere body 10. Referring to the instant embodiment, the first spherical surface 101 is distributed along a longitudinal direction and the second spherical surface 102 is distributed along a lateral direction. The first spherical surface 101 and the second spherical surface 102 are distributed on the sphere body 10 in a way complementing to each other. The two end parts of the first spherical surface 101 are respectively a first expansion surface 1011 and a second expansion surface 1012 (FIG. 1B). The rear side of the sphere body 10 is shown in FIG. 1B. Between the first expansion surface 1011 and the second expansion surface 1012 is a first narrow surface 1013. In other words, two terminals of the first narrow surface 1013 respectively connect to the first expansion surface 1011 and the second expansion surface 1012.

As shown in FIGS. 1A and 1B, two terminals of the second spherical surface 102 are respectively a third expansion surface 1023 and a fourth expansion surface 1024. Between the third expansion surface 1023 and the fourth expansion surface 1024 is a second narrow surface 1025. The second narrow surface 1025 connects to the third expansion surface 1023 and the fourth expansion surface 102. The first spherical surface 101 and the second spherical surface 102 are basically identical and are both surfaces in an "8" shaped form that complement each other. The only difference between the first spherical surface 101 and the second spherical surface 102 is the longitudinal or the lateral distribution direction for the first spherical surface 101 and the second spherical surface 102 to follow. Hence, the aforementioned technical features related to first spherical surface 101 that between the first expansion surface 1011 and the second expansion surface 1012 is the first narrow surface 1013 are also able to be derived from the example of the second spherical surface 102. Two terminals of the first narrow surface 1013 are respectively connected to the first expansion surface 1011 and the second expansion surface 1012. The containing space 13 is formed from the first expansion surface 1011 along a longitudinal direction toward the inside of the sphere body 10.

Please refer to FIG. 1A. The light source module 20 includes a cylinder 21 and several light emitting diodes D disposed on the cylinder 21. The diameter of the cylinder 21 is decreased from an upper end of the cylinder 21 to a lower end of the cylinder 21. Preferably, the light source module 20 also includes an upper thread portion 22. The upper thread portion 22 is connected to the upper end of the cylinder 21. The upper thread portion 22 has a diameter decreased from the upper end of the upper thread portion 22 to the lower end of the upper thread portion 22. In addition, the light source module 20 also includes a lower thread portion 23. The lower thread portion 23 is connected to the lower end of the cylinder 21. The lower thread portion 23 has a diameter decreased from the upper end of the lower thread portion 23 to the lower end of the lower thread portion 23. The light source module 20 basically has a diameter decreased from the upside to the downside so that it is convenient for the light source module 20 to be put into the containing space 13 and for the lower thread portion 23 as well as the upper thread portion 22 to be bolted with the lower inner screw thread (not shown) and the upper inner screw thread (FIG. 1A; label not shown) around the containing space 13. In addition, the light source module 20 can also include a flexible printed circuit board 24. A circuit (not shown) of the flexible printed circuit board 24 is connected and/or disposed with several light emitting diodes D. The flexible printed circuit board 24 can be laterally disposed on a first portion 211 of an outer wall 210 of the cylinder 21 and electrically connected with a first electrode sheet 2111 and a second electrode sheet 2111' on the first portion 211. A second portion 212 of the outer wall 210 of the cylinder 21 is aside from the first portion 211. A battery installation space 2120 is opened on the second portion 212 of the outer wall 210 of the cylinder 21 for being installed with a battery B. The first electrode sheet 2111 and the second electrode sheet 2111' pass through the outer wall 210 of the cylinder 21 to extend to the battery installation space 2120 and to be embedded to the first portion 211 of the outer wall 210 of the cylinder 21. The first electrode sheet 2111 and the second electrode sheet 2111' can be used for electrically connecting to the battery B. The outer wall 210 of the cylinder 21 is assembled with the flexible printed circuit board 24. The largest diameter of the cylinder 21 with the flexible printed circuit board 24 disposed thereon is still smaller than the smallest diameter of the upper thread portion 22. In addition, a smallest diameter of the cylinder 21 with the flexible printed circuit board 24 disposed thereon is smaller than a largest diameter of the lower thread portion 23, and the largest diameter of the lower thread portion 23 is not larger than the smallest diameter of the upper thread portion 22. As a result, the light source module 20 can be disposed and screwed inside the containing space 13 without being blocked. In order to allow the light source module 20 with structure of upside wide and downside narrow to be able to be assembled in the containing space 13, the diameter of the opening of the containing space 13 gets narrowed from the shallow location to the deep location of the containing space 13 along the depth direction of the containing space 13.

Figure 1E:
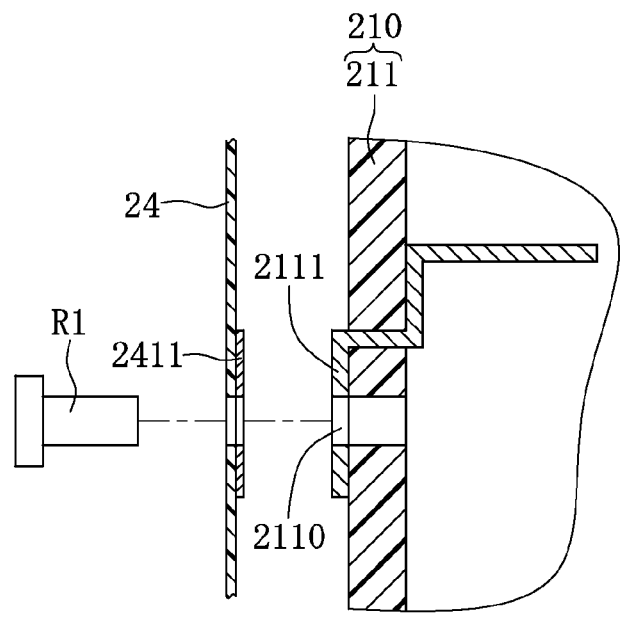
FIG. 1E shows an exploded cross-sectional view of the flexible printed circuit board and the cylinder according to the modified sphere structure of the first embodiment of the present disclosure.
Figure 1F:
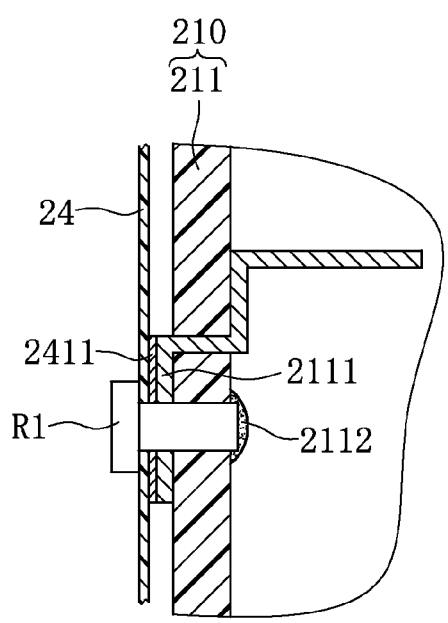
FIG. 1F shows a cross-sectional view of the flexible printed circuit board and the cylinder according to the modified sphere structure of the first embodiment of the present disclosure.
Figure 1G:
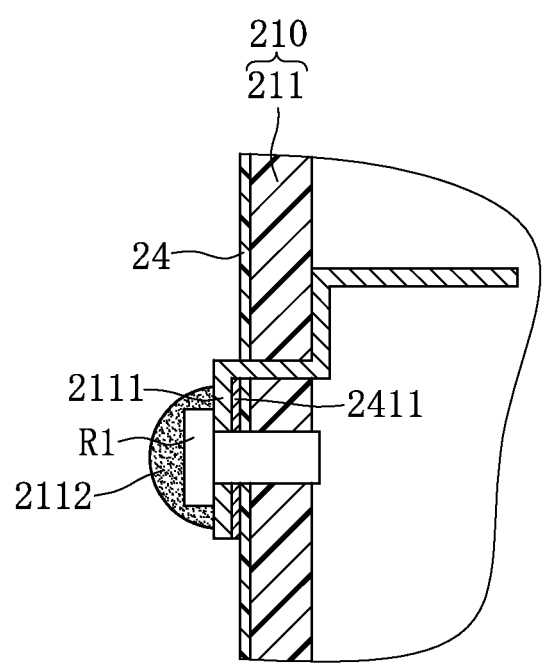
FIG. 1G shows a another cross-sectional view of the flexible printed circuit board and the cylinder according to the modified sphere structure of the first embodiment of the present disclosure.

Please refer to FIG. 1A. A first screw hole 2110 and a second screw hole 2110' are formed on the outer wall 210 of the cylinder 21. The first screw hole 2110 and the second screw hole 2110' respectively correspond to the first electrode sheet 2111 and the second electrode sheet 2111'. The first electrode sheet 2111 and the second electrode sheet 2111' respectively correspond to a first electrode 2411 and a second electrode 2412 of the flexible printed circuit board 24. In addition, as shown in FIGS. 1A, 1E and 1F, the first electrode 2411 and the first electrode sheet 2111 are both opened with holes corresponding to the first screw hole 2110. As shown in FIG. 1A, the second electrode 2412 and the second electrode 2111' are both opened with holes corresponding to the second screw hole 2110'. Hence, the flexible printed circuit board 24 can be fixed on the outer wall 210 of the cylinder 21 by a first screw R1 (shown in FIGS. 1A, 1E and 1F) set through the first electrode 2411, the first electrode sheet 2111 and the first screw hole 2111', and a second screw R2 (shown in FIG. 1A) set through the second electrode 2412, the second electrode sheet 2111' and the second screw hole 2110'. Preferably, as shown in FIGS. 1E and 1F, the first screw R1 is fixed by a first soldering portion 2112 formed on an inner wall of the cylinder 21. Similarly, to explain by analogy according to FIGS. 1E and 1F, the second screw R2 can also be fixed by a second welding portion (not shown) formed on the inner wall of the cylinder 21. Preferably, the first screw R1 and the second screw R2 are electrically-conducting, in other words the first screw R1 and the second screw R2 are electrically-conducting elements. As shown in FIGS. 1E and 1F, another assembling way among the first screw R1, the first screw hole 2110 and the first electrode 2411 as well as the first electrode sheet 2111 of the flexible printed circuit board 24 is illustrated. The main difference between FIGS. 1F and 1E is that the first electrode sheet 2111 is able to pass through the flexible printed circuit board 24 and the outer wall 210 of the cylinder 21 to extend to the battery installation space 2120 and the first electrode sheet 2111 also connects to the first electrode 2411 of the flexible printed circuit board 24 to form an electrical connection with the battery B. Please refer to FIGS. 1A and 1F. The second electrode sheet 2111' can also pass through the flexible printed circuit board 24 and the outer wall 210 of the cylinder 21 to extend to the battery installation space 2120 and the second electrode sheet 2111' can also connect to the second electrode 2412 so that the second electrode 2412 on the circuit of the flexible printed circuit board 24 is able to form electrical connection with battery. As the second electrode 2412 and the first electrode 2411 respectively electrically connect to different electrodes of the battery B, the electrical circuit of the flexible printed circuit board 24 is electrically conducted. A first screw hole 2110 (FIG. 1F) and a second screw hole 2110' (the following elements named with "second" can refer to FIGS. 1A and 1F by analogy) are formed on the outer wall 210 of the cylinder 21. The first screw hole 2110 and the second screw hole 2110' respectively correspond to the first electrode sheet 2111 and the second electrode sheet 2111'. The first electrode sheet 2111 and the second electrode sheet 2111' respectively correspond to the first electrode 2411 and the second electrode 2412 of the flexible printed circuit board 24. As shown in FIG. 1F, the flexible printed circuit board 24 is fixed on the outer wall 210 of the cylinder 21 by a first screw R1 set through the first electrode 2411, the first electrode sheet 2111 and the first screw hole 2110 as well as a second screw R2 set through the second electrode 2412, the second electrode sheet 2111' and the second screw hole 2110'. In addition, the first screw R1 and the second screw R2 can also be soldered to be fixed with the first soldering portion 2112 and the second soldering portion (not shown) on the flexible printed circuit board 24.

Please refer to FIG. 1A. The flexible printed circuit board 24 further includes a screw hole portion 241. The first electrode 2411 and the second electrode 2412 are arranged apart at a distance from each other and assembled on the screw hole portion 241. At least one light emitting diode D, or preferably two light emitting diodes but not being limited thereto, are disposed side by side between the first electrode 2411 and the second electrode 2412. The two light emitting diodes D are respectively defined as a first middle light emitting diode D21 and a second middle light emitting diode D22.

As shown in FIG. 1A, the flexible printed circuit board 24 also includes an upper winding arm 242 connecting to an end (upper end) of the screw hole portion 241 so that an end of the screw hole portion 241 connecting to the upper winding portion 242 is defined as a base end (label not shown), and an end of the screw hole portion 241 not connecting to the upper winding portion 242 is defined as a free end. Several light emitting diodes D are disposed on the upper winding arm 242. Here three light emitting diodes D are used for illustration but it is not limited thereto. In a viewpoint from the base end to the free end of the upper winding arm 242, the light emitting diodes D on the upper winding arm 242 at least can be a first upper light emitting diode D11, a second upper light emitting diode D12, and a third upper light emitting diode D13. The screw hole portion 241 can set on the first portion 211 of the cylinder 21. The upper winding arm 242 can be disposed on an upper side location relative to the first portion 211 and the second portion 212 of the cylinder 21.

As shown in FIG. 1A, the flexible printed circuit board 24 also includes a lower winding arm 243 connecting to an another end (lower end) of the screw hole portion 241 so that an end of the screw hole portion 241 connecting to the lower winding portion 243 is defined as a base end (label not shown), and an end of the screw hole portion 241 not connecting to the lower winding portion 243 is defined as a free end (label not shown). Several light emitting diodes D are disposed on the lower winding arm 243. Hereby three light emitting diodes D are used for illustration but the quantity of the light emitting diodes is not limited thereto. In a viewpoint from the base end to the free end of the lower winding arm 243, the light emitting diodes D on the lower winding arm 243 at least can be a first lower light emitting diode D31, a second lower light emitting diode D32, and a third lower light emitting diode D33. The lower winding arm 243 is windingly disposed on a lower side location relative to the first portion 211 and the second portion 212 of the cylinder 21. Besides, the upper winding arm 242 and the lower winding arm 243 can extend toward a same side from the screw hole portion 241. It is known that the screw hole portion 241, the upper winding arm 242 and the lower winding arm 243 can together form a U-type flexible printed circuit board.

Please refer to FIGS. 1A and 1B. The light releasing space 120 in the groove 12 close to the first expansion surface 1011 aside from the second narrow surface 102 is defined as a second upper sub-space 122. The groove 12 at two sides of the first expansion surface 1011 is defined as a first upper sub-space 121 and a third upper sub-space 123. The second upper light emitting diode D12, the first upper light emitting diode D11 and the third upper light emitting diode D13 respectively corresponds to the second upper sub-space 122, the first upper sub-space 121 and the third upper sub-space 123 as the light source module 20 is assembled into the sphere body 10 by a way of threading.

Please refer to FIG. 1B. The light releasing spaces 120 in the groove 12 at two sides of the first narrow surface 1013 are respectively defined as a first middle sub-space 124 and a second middle sub-space 125. The first middle sub-space 124 and the second middle sub-space 125 respectively correspond to the first middle light emitting diode D21 and the second middle light emitting diode D22.

Please refer to FIG. 1B. The light releasing space 120 in the groove 12 at a side of the second narrow surface 1025 and such side being away from the first expansion surface 1011 is defined as a second lower sub-space 127. The light releasing spaces 120 in the groove 12 at two sides of the second expansion surface 1012 are respectively defined as a first lower sub-space 126 and a third lower sub-space 128. The second lower light emitting diode D32, the first lower light emitting diode D31 and the third lower light emitting diode D33 respectively correspond to the second lower sub-space 127, the first lower sub-space 126 and the third lower sub-space 128. Thus, the above-mentioned plurality of sub-spaces can respectively correspond to a light emitting diode D so that the light coming from the light source module 20 can be transmitted to the light releasing space 120 and the light guiding member 30 in the light releasing space 120, so as to allow the light to be evenly distributed in the whole groove 12. The corresponding relationships between each of the above-mentioned light emitting diodes D and each of the sub-spaces are not limited to be an aligned relationship. As long as the light coming from the light emitting diodes D can be transmitted to the light guiding member 30 in the light releasing space 120, the corresponding relationship aforementioned is met and resulted. The resulted light releasing effect can be good and the light source module 20 can be protected from the impact force from the outside to decrease chances of being broken for the reason that the light source module 20 is basically disposed in the containing space 13 inside the sphere body 10.

Figure 3:
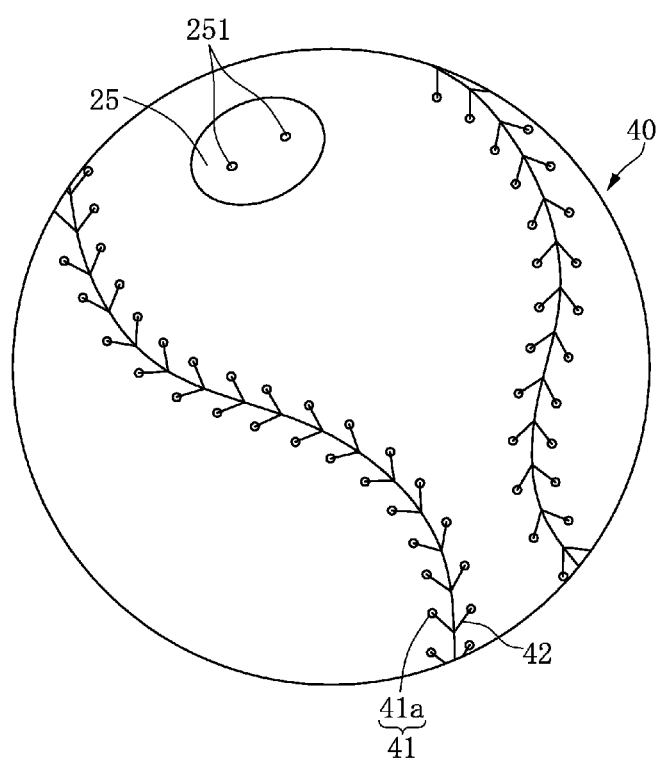
FIG. 3 is a schematic diagram showing the modified sphere structure covered with a covering layer as the formal baseball.

Please refer to FIG. 3. A covering layer 40 is further included in the present disclosure. The covering layer 40 is able to cover the surface 11 of the sphere body 10 as shown in FIGS. 1A and 1B to form the condition as shown in FIG. 3. A part of the distribution path 40 is of a baseball seam path and has a light transmissive region 41, where the light transmissive region 41 is defined from a baseball seam 41a. The baseball seam 41a is distributed along the baseball seam path and the baseball seam path is seamed with the baseball suture 42. Thus, the light source module 20 as shown in FIGS. 1A and 1B can emit light evenly into the light guiding member 30 disposed in the groove 12 and the light can be transmitted to the outside through the baseball seam 41a. Please refer to FIGS. 1A and 3. When the battery is out, the light source module 20 can be taken out from the containing space 13 of the sphere body 10 by screwing the screw latch 251 on the top arc surface 25 of the light source module 20 so that the battery B can be renewed. Taking a baseball for an example, the material of the top arc surface 25 of the light source module 20 can be the same as the surface material of a baseball, like the covering layer 40 shown in FIG. 3. When the light source module 20 is screwed into the containing space 13, the covering layer 40, as shown in FIG. 3, can be flushed with the top arc surface 25. A hollow region on the covering layer 40 corresponding to the top arc surface 25 can be reserved to form a hole responsible for allowing the top arc surface 25 to be uncovered when the sphere body 10 is covered with the covering layer 40. The replacement of the batteries can be more convenient.

Second Embodiment

Figure 2:
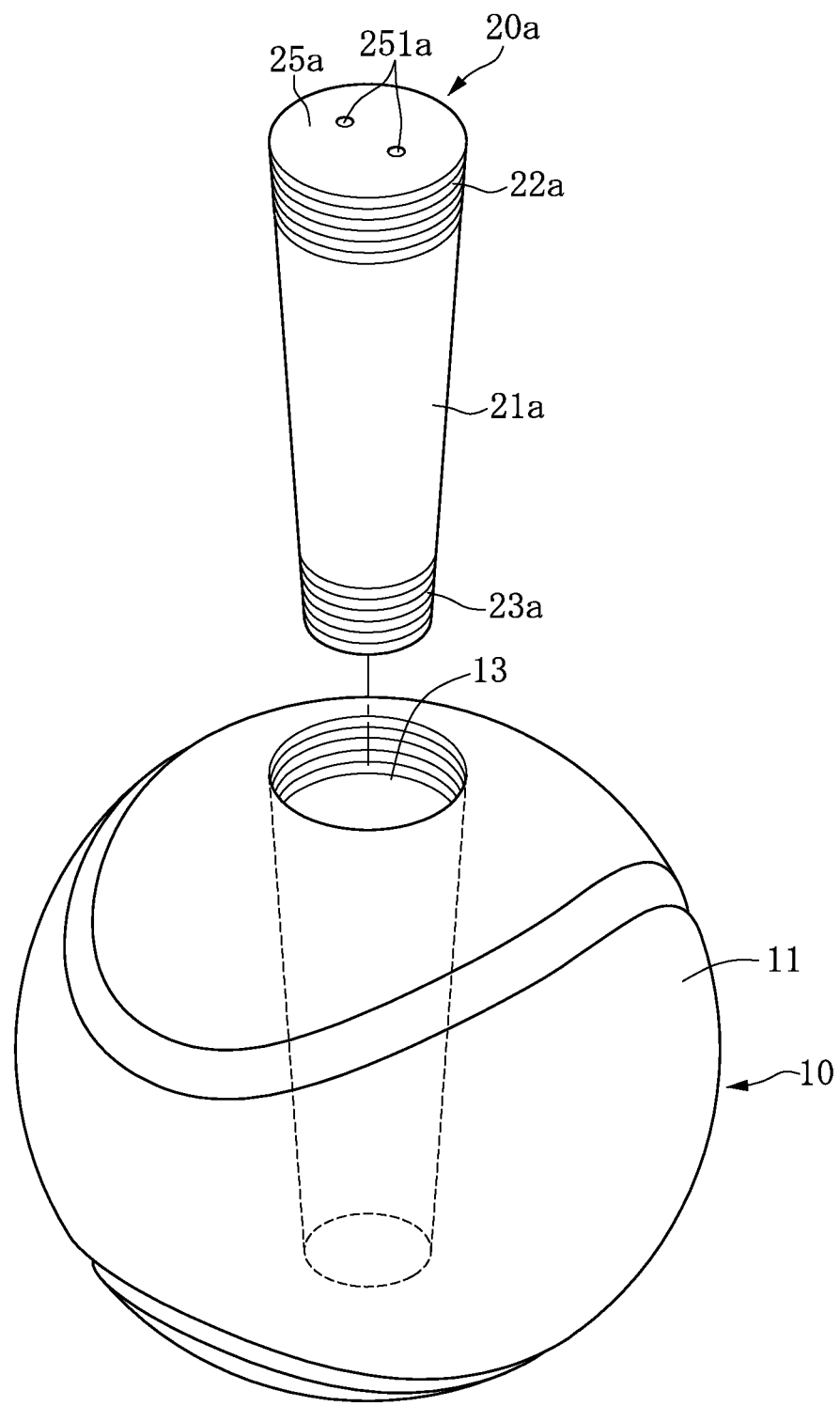
FIG. 2 shows an exploded perspective view of the modified sphere structure according to the second embodiment of the present disclosure.

The main difference of the second embodiment to the first embodiment is that the light source module being used is different. Please refer to FIG. 2 which illustrates the light source module 20a belonging to the second embodiment. The light source module 20a includes a luminescence column 21a, an upper thread portion 22a and a lower thread portion 23a. The luminescence column 21a has a diameter decreased from an upper end of the luminescence column 21a to a lower end of the luminescence column 21a. The upper thread portion 22a connects to the upper end of the luminescence column 21a. The upper thread portion 22 has a diameter decreased from an upper end of the upper thread portion 22a to a lower end of the upper thread portion 22a. The lower thread portion 23a connects to a lower end of the luminescence column 21a. The lower thread portion 23a has a diameter decreased from an upper end of the lower thread portion 23a to a lower end of the lower thread portion 23a. A largest diameter of the luminescence column 21a is smaller or not larger than a smallest diameter of the upper thread portion 22a. The luminescence column 21a has a smallest diameter smaller or not larger than the largest diameter of the lower thread portion 23a. The largest diameter of the lower thread portion 23a is not larger than a smallest diameter of the upper thread portion 22a. The luminescence column 21a is basically a fluorescence stick, as a result the whole luminescence column 21a emits light and the light emitted is not limited to the location and quantity of the light emitting diodes introduced in the first embodiment. The light source module 20a also becomes a consumable material. As the fluorescence diminishes and disappears, users can take the light source module 20a out from the containing space 13 of the sphere body 10 by screwing the screw latch 251a on the top arc surface 25a of the light source module 20a so that the light source module 20a can be renewed. Taking a baseball for an example, the material of the top arc surface 25a of the light source module 20a can be the same as the surface material of a baseball, like the covering layer 40 shown in FIG. 3. When the light source module 20a is screwed into the containing space 13, the covering layer 40, as shown in FIG. 3, can be flushed with the top arc surface 25a. A hollow region on the covering layer 40 corresponding to the top arc surface 25a can be reserved to form a hole responsible for allowing the top arc surface 25a to be uncovered when the sphere body 10 is covered with the covering layer 40. The replacement of the luminescence column 21a can be more convenient.

Third Embodiment

Figure 4A:
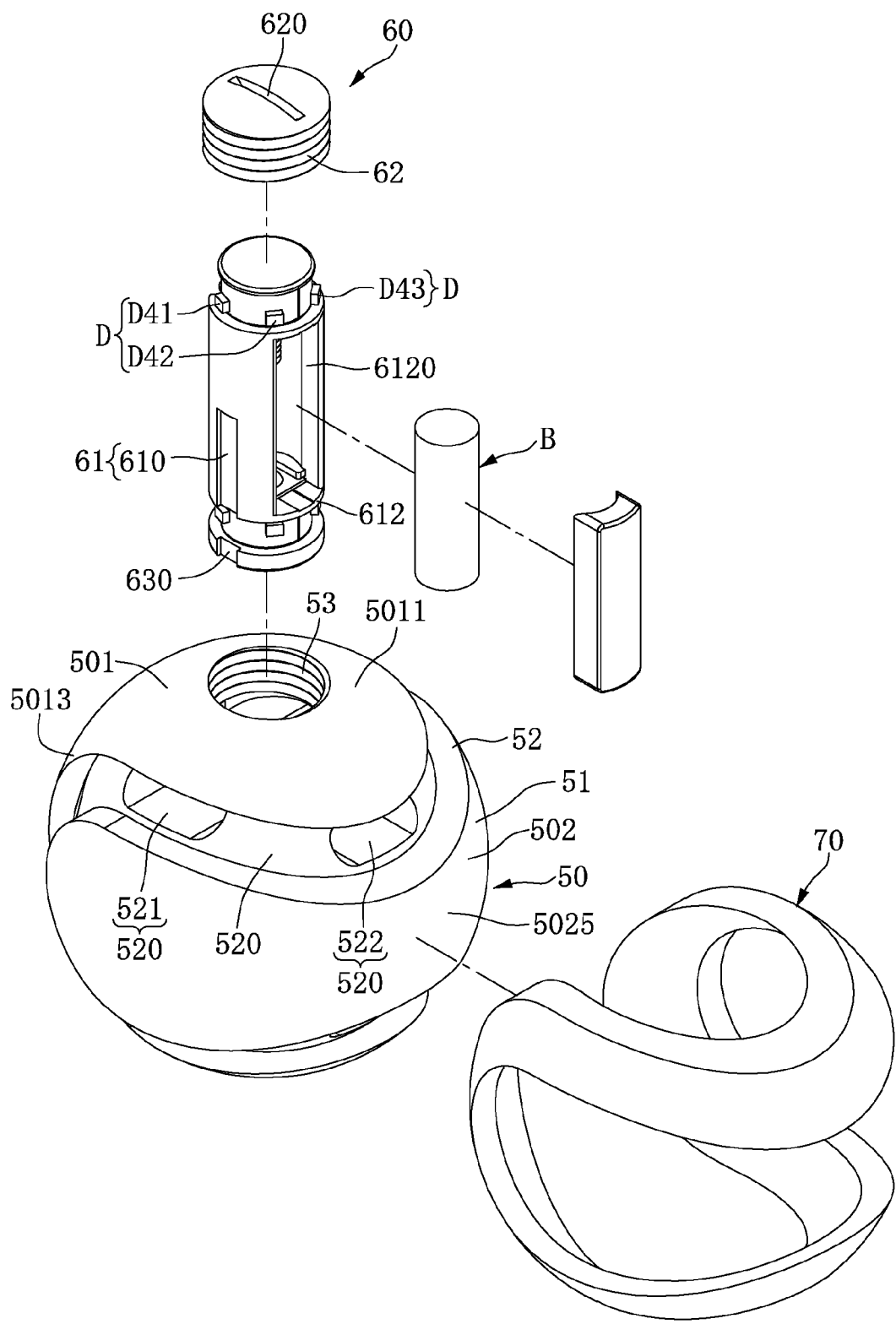
FIG. 4A shows an exploded perspective view of the modified sphere structure according to the third embodiment of the present disclosure.
Figure 4B:
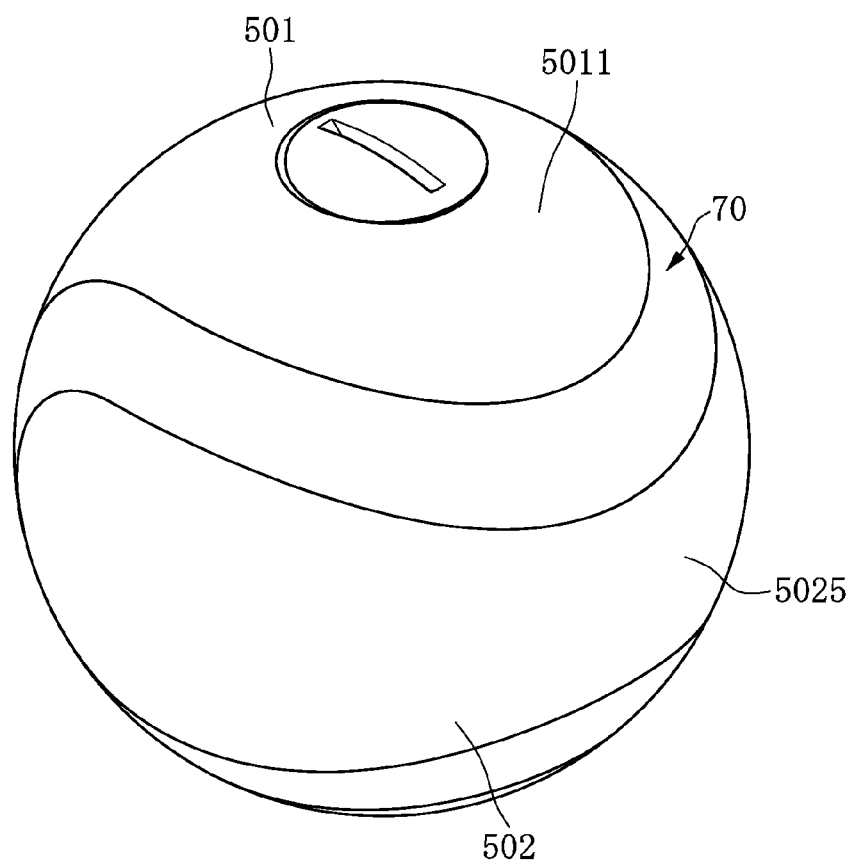
FIG. 4B shows a perspective view of the modified sphere structure according to the third embodiment of the present disclosure.

Please refer to FIG. 4A. Basically, one difference between the third embodiment and the aforementioned embodiments is that the upper thread portion 62 of the light source module 60 can be apart from the cylinder 61 and can be used for blocking the upper end of the cylinder 61 so that the upper thread portion 62 can be viewed as an upper cap with thread (or it may be named as an upper thread cap). As the assembling is undergoing, the cylinder 61 can be put into the containing space 53 at first. A fool-proofing notch 630 is formed at the lower end of the cylinder 61. The fool-proofing notch 630 corresponds to the fool-proofing bump 531 formed within the containing space 53 shown in FIG. 4H.

Figure 4C:
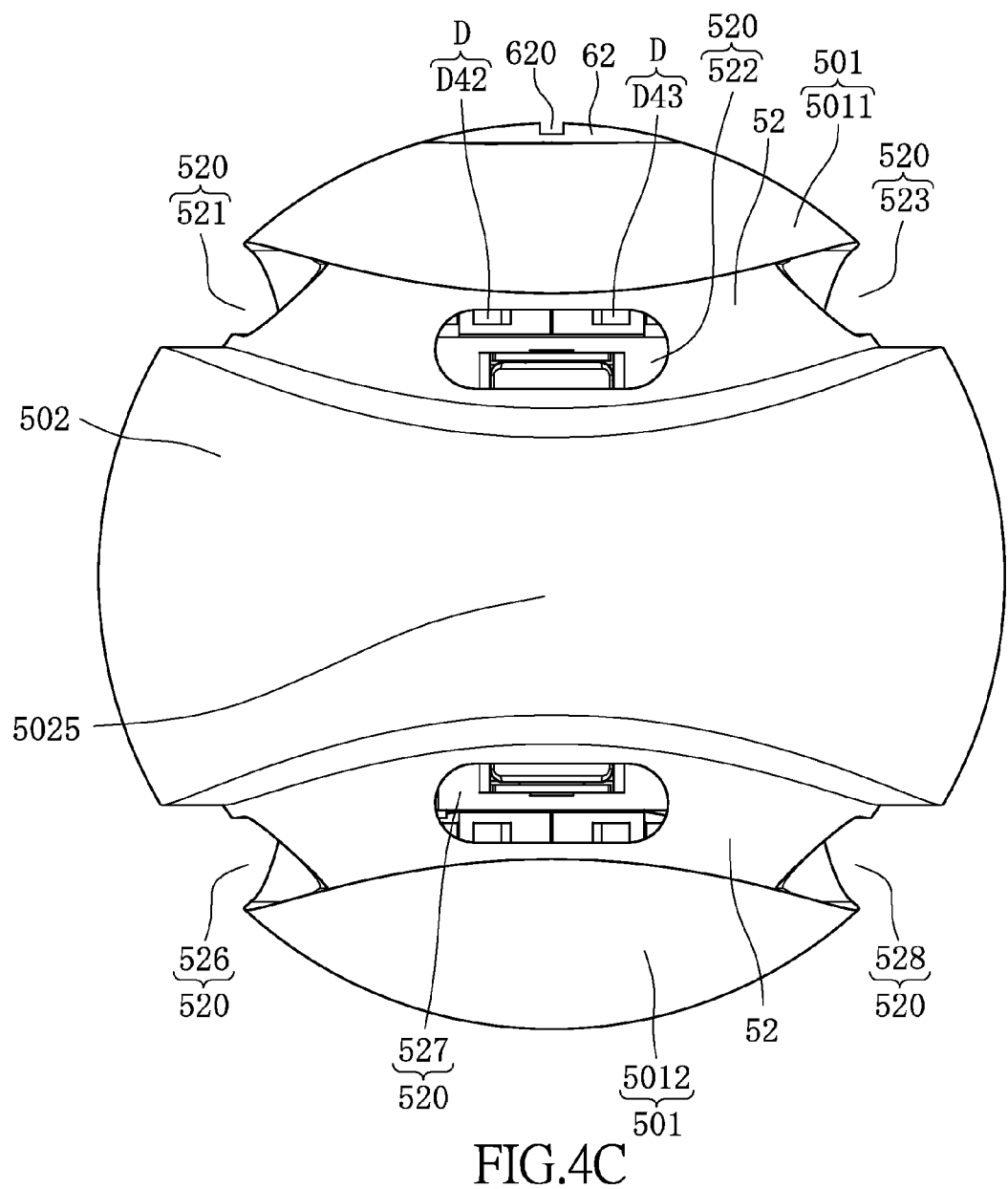
FIG. 4C shows a front side view of the modified sphere structure without being assembled with the light guiding member according to the third embodiment of the present disclosure.
Figure 4D:
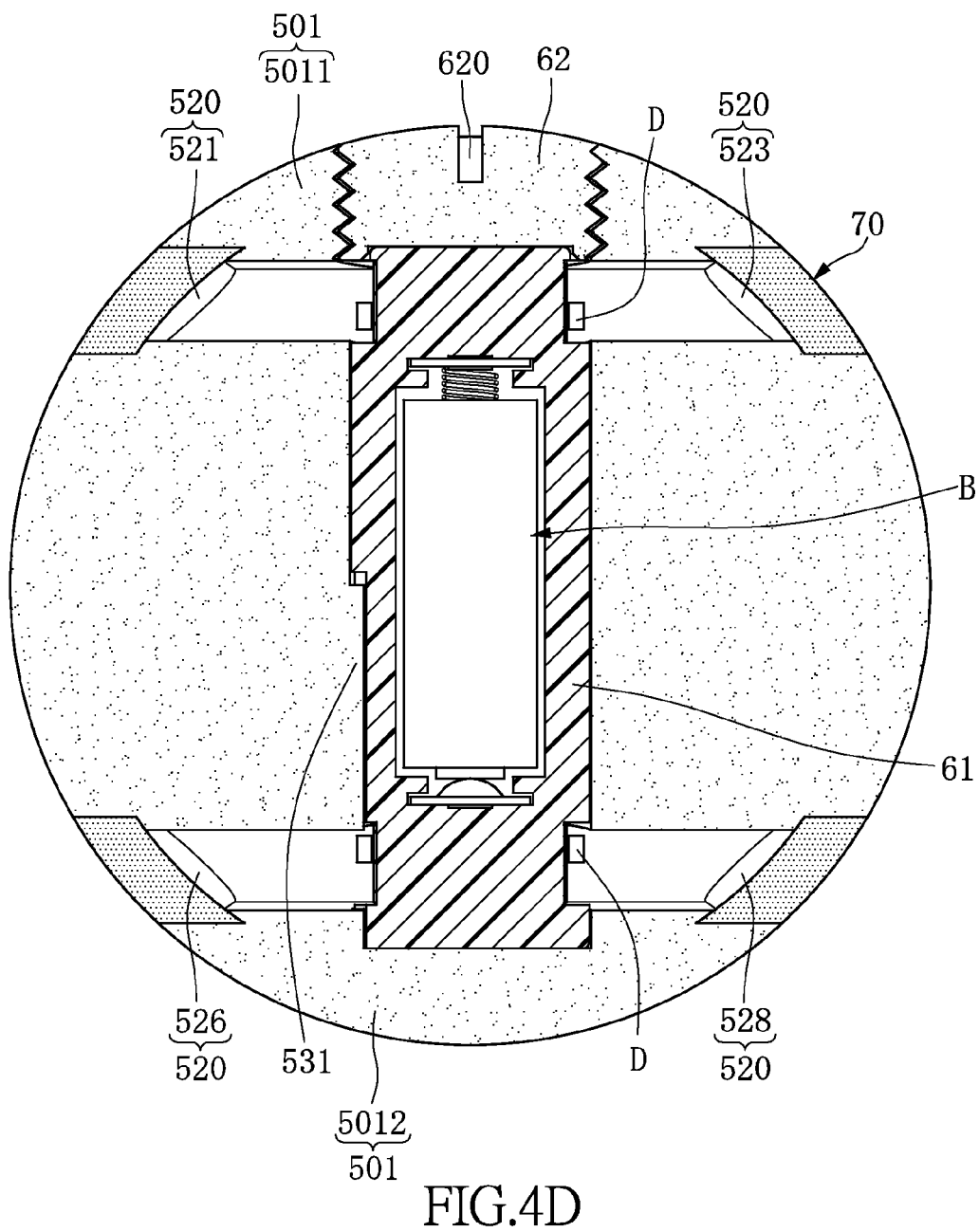
FIG. 4D shows a longitudinal cross-sectional view of the modified sphere structure according to the third embodiment of the present disclosure.
Figure 4E:
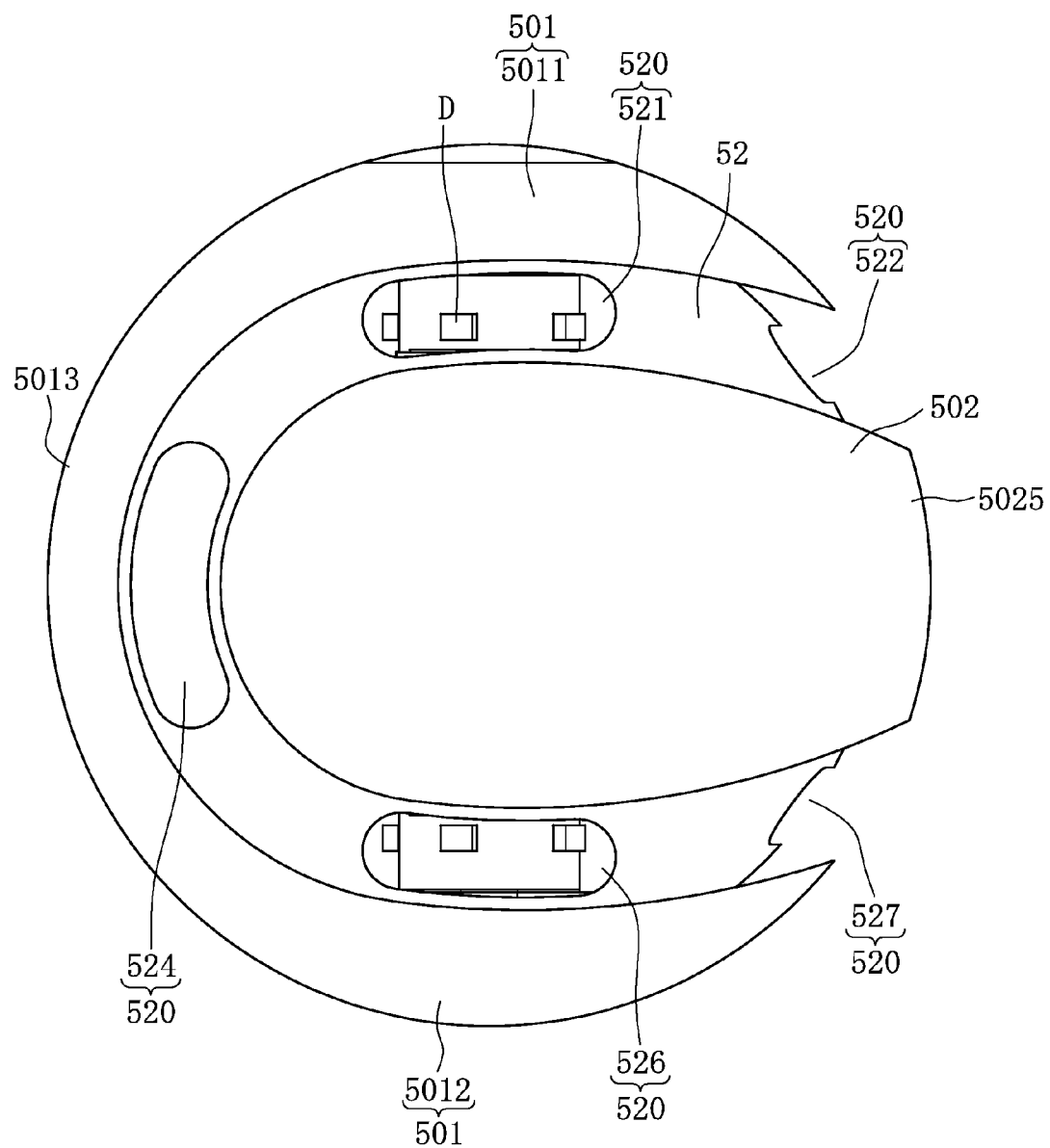
FIG. 4E shows a lateral side view of the modified sphere structure without being assembled with the light guiding member according to the third embodiment of the present disclosure.
Figure 4F:
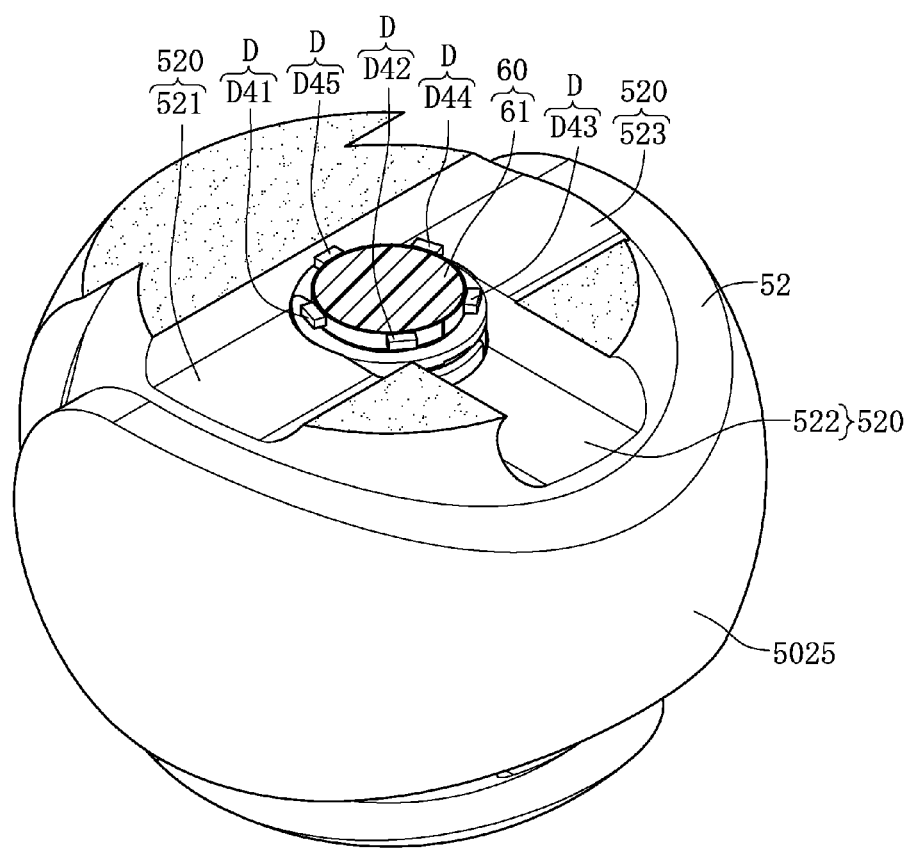
FIG. 4F shows a lateral cross-sectional view of the upper portion of the modified sphere structure according to the third embodiment of the present disclosure.
Figure 4G:
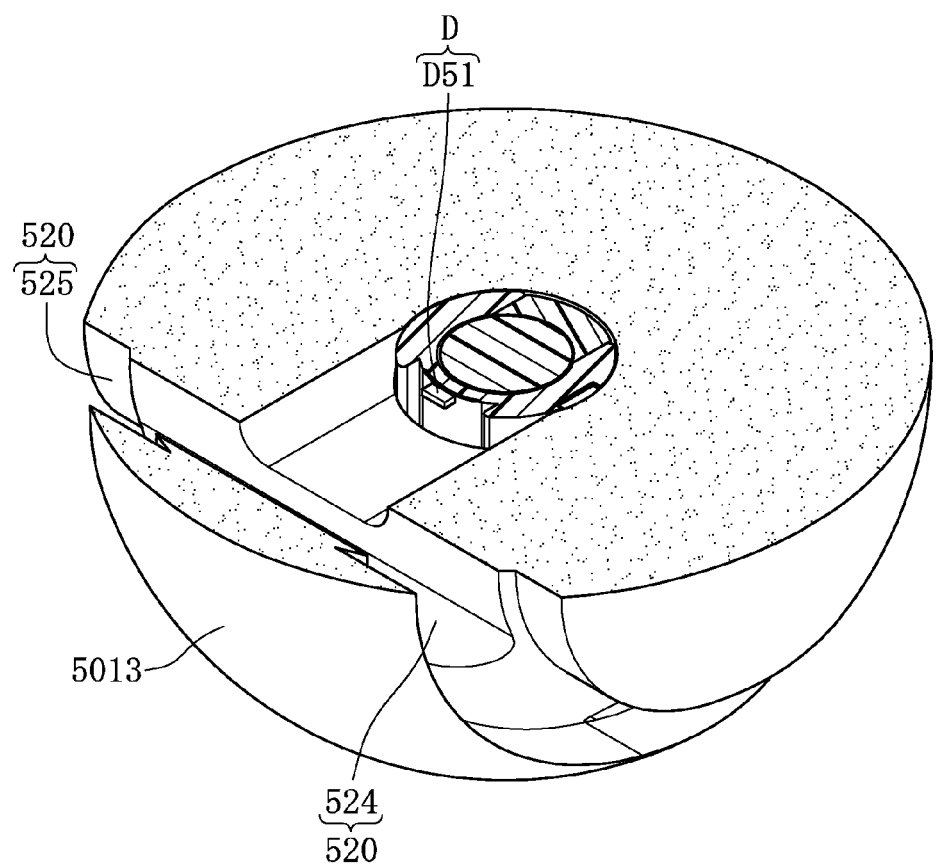
FIG. 4G shows a lateral cross-sectional view of the upper portion of the modified sphere structure according to the third embodiment of the present disclosure.
Figure 4H:
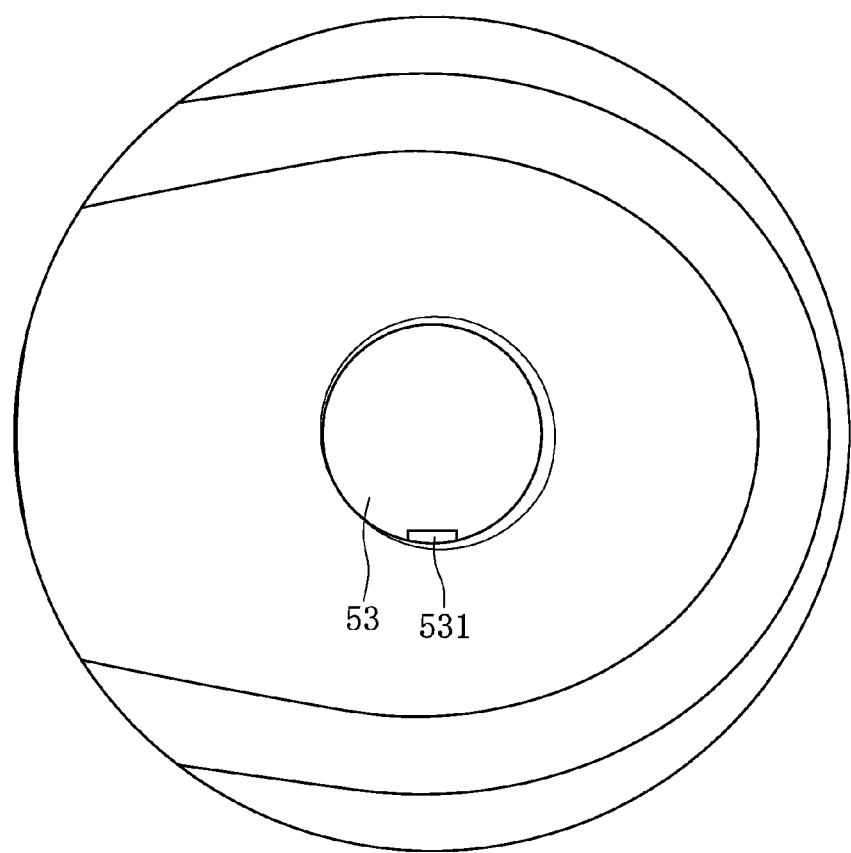
FIG. 4H shows an overlook view of the modified sphere structure without any light sources assembled therein according to the third embodiment to show the fool-proofing bump inside the containing space.

Please refer to FIGS. 4A, 4C and 4E. Being similar to the first spherical surface 101 and second spherical surface 102 mentioned in the first embodiment, the surface 51 of the sphere body 50 of the present third embodiment also includes a first spherical surface 501 and a second spherical surface 502. As shown in FIGS. 4A and 4C, the light releasing space 520 in the groove 52 close to the first expansion surface 5011 aside from the second narrow surface 5025 is defined as a second upper sub-space 522. The light releasing spaces 520 in the groove 52 at two sides of the first expansion surface 5011 are defined as a first upper sub-space 521 and a third upper sub-space 523. The light emitted from the light emitting diodes D disposed on the upper portion of the cylinder 61 can respectively pass through the second upper sub-space 522, the first upper sub-space 521 and the third upper sub-space 523 to reach to the light guiding member 70. The light releasing space 520 of the groove 52 at a side away from the first expansion surface 5011 is defined as a second lower sub-space 527. The light releasing spaces 520 of the groove 52 at two sides of the second expansion surface 5012 are respectively defined as a first lower sub-space 526 and a third lower sub-space 528, so as to allow the light emitted from the several lower light emitting diodes D to respectively pass through the second lower sub-space 527, the first lower sub-space 526 and the third lower sub-space 528 to reach to the light guiding member 70 (FIG. 4A). Please refer to FIGS. 4A, 4E and 4G. the light releasing spaces 520 of the groove 52 at two sides of the first narrow surface 5013 are defined as a first middle sub-space 524 and a second middle sub-space 525 (FIG. 4G), so as to allow the light emitted from the at least one middle light emitting diode D (also being designated as middle light emitting diode D51) to respectively pass through the first middle sub-space 524 and the second middle sub-space 525 to reach to the light guiding member 70 as shown in FIG. 4A. Preferably, the fool-proofing notch 630 formed at the lower end of the cylinder 61 corresponds to the fool-proofing bump 531 shown in FIG. 4H. Thus, the several light emitting diodes D on the cylinder 61 as shown in FIG. 4F can form a nice corresponding relationship with the first upper sub-space 521 and the second upper sub-space 522 shown in FIG. 4A and/or the third upper sub-space 523 as shown in FIG. 4F. Please refer to FIGS. 4A, 4C, 4D, 4E, 4F and 4G. The light emitting diodes D disposed on the upper end of the cylinder 61 that is close to the upper thread cap/portion can include a first upper light emitting diode D41, a second upper light emitting diode D42, a third upper light emitting diode D43, a forth upper light emitting diode D44 (shown in FIG. 4F) and a fifth upper light emitting diode D45 (shown in FIG. 4F), however it is not limited to the quantity of five. As for the first upper light emitting diode D41, the second upper light emitting diode D42, the third upper light emitting diode D43, the forth upper light emitting diode D44 and the fifth upper light emitting diode D45, they do not have to respectively precisely align to the first upper sub-space 521, the second upper sub-space 522 and the third upper sub-space 523 etc. as shown in FIG. 4F. Once the light releasing space 520 shown in FIGS. 4A and 4B, or the first upper sub-space 521, the second upper sub-space 522 and the third upper sub-space 523 shown in FIG. 4C are filled with the light guiding member 70, the light emitted from the light emitting diodes D can still be transmitted to the light guiding member 70 so as to allow the light to be emitted to the outside of the sphere body 50. As the cylinder 61 is assembled to the sphere body 50, the upper thread portion 62 can be subsequently screwed into the containing space 53, and the upper end of the cylinder 61 can be abutted, revealing that the upper thread portion 62 indeed plays a role of a cap. Thus, the upper thread portion 62 can be viewed as an upper cap with thread/an upper thread cap. Preferably, as shown in FIGS. 4A, 4B, 4C, 4D, a concave slit 620 is formed on the top surface of the upper thread portion 62. Users can screw the upper thread portion 62 in or out of the containing space 53 with the aid of inserting a coin to engage the concave slit 620. In addition, the feature of the upper thread portion 62 demonstrated in the instant embodiment can be combined with the feature of the upper thread portion 12 introduced in the first embodiment so that the upper thread portion 62 could have a diameter gradually decreased from the upper end of the upper thread portion 62 to the lower end of the upper thread portion 62. The light emitting diode D of the instant embodiment can be directly disposed on the cylinder 61, and the electrical conductivity can be turned on by the electrical connection formed between the circuit (not shown) and the battery inside the cylinder 61. However, the aforementioned embodiment can be used such as the flexible printed circuit board (referring to FIG. 1A) with light emitting diodes D being disposed thereon. The technical feature related to the flexible printed circuit board with light emitting diodes D being disposed thereon will not be reintroduced here and can be referred to in the foregoing contents.

Figure 5A:
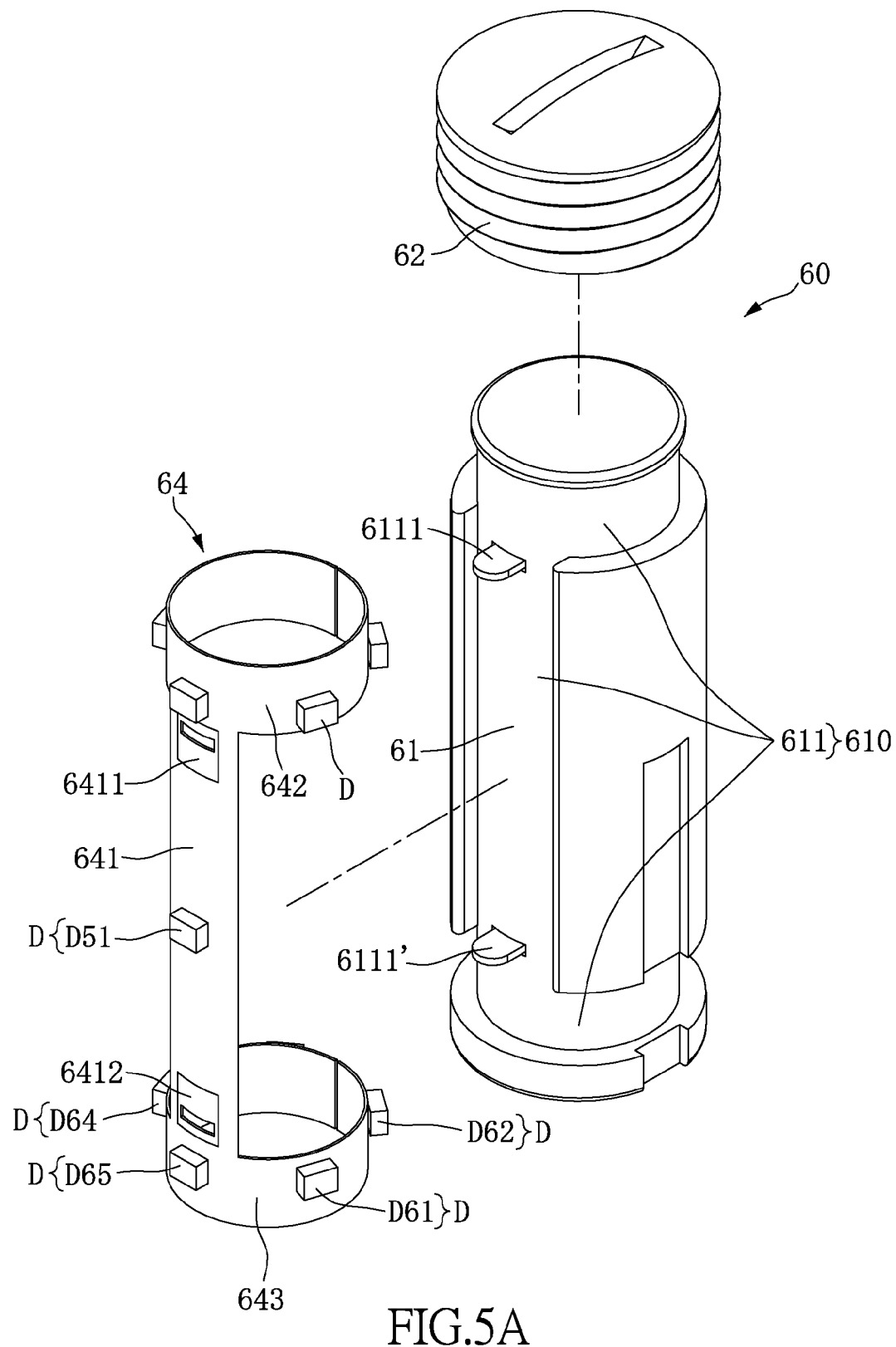
FIG. 5A shows an exploded schematic diagram of the light source module according to the third embodiment of the present disclosure.
Figure 5B:
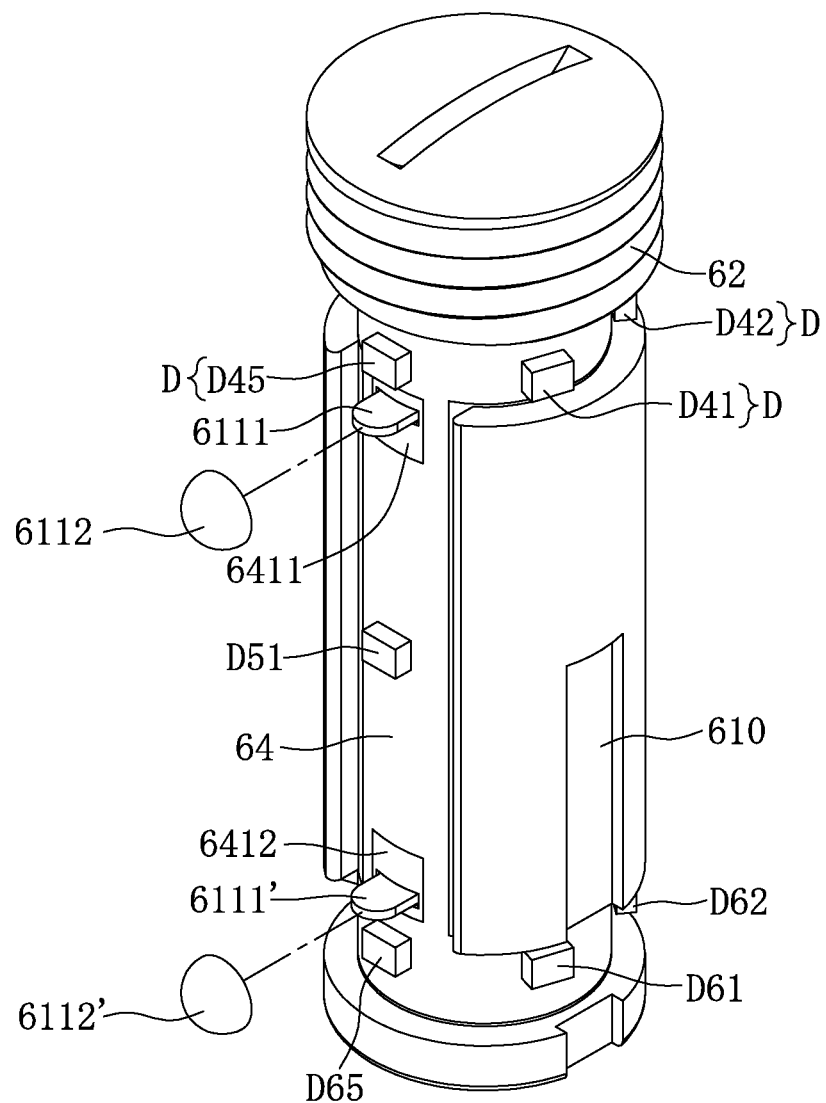
FIG. 5B shows a perspective view of the light source module according to the third embodiment of the present disclosure.

Please refer to FIGS. 4A, 5A and 5B. Another preferred example of the present embodiment is that a circuit of the flexible printed circuit board 64 (not shown) can be electrically connected with several light emitting diodes D. The flexible printed circuit board 64 can be disposed on a first portion 611 on the outer wall 610 of the cylinder 61. A second portion 612 on the outer wall 610 of the cylinder 61 can be opened to form a battery installation space 6120 (shown in FIG. 4A) and a battery B can be assembled inside the battery installation space 6120. The first electrode sheet 6111 and the second electrode sheet 6111' can pass through the outer wall 610 of the cylinder 61 to extend to the battery installation space 6120 and to be embedded to the first portion 611 of the outer wall 610 of the cylinder 61. The first electrode sheet 6111 and the second electrode sheet 6111' can be used for electrically connecting to the battery B. Preferably, as the outer wall 610 of the cylinder 61 is assembled with the flexible printed circuit board 64, the largest diameter of the cylinder 61 with the flexible printed circuit board 64 disposed thereon is still smaller than the smallest diameter of the upper thread portion 62 (also being designated as upper cap with thread). Preferably, the first electrode sheet 6111 and the first electrode 6411 can be fixed by a first soldering portion 6112 on the flexible printed circuit board 64. The second electrode sheet 6111' and the second electrode 6412 can be fixed by a second soldering portion 6112' on the flexible printed circuit board 64. It does not matter even if the first electrode sheet 6111 and the second electrode sheet 6111' cause a slight protrusion along the thickness direction of the flexible printed circuit board 64 and the soldering can be directly applied thereto. However, the first electrode sheet 6111 and the second electrode sheet 6111' can be slightly bended to be flatly flat to the flexible printed circuit board 64 and the electrical connection between the first electrode sheet 6111 and the first electrode 6411 as well as the electrical connection between the second electrode sheet 6111' and the second electrode 6412 can be assured. Subsequently, the soldering work can be applied on the electrically connected first electrode sheet 6111 and the first electrode 6411 to form the first soldering portion 6112 on the outer surface of the flexible printed circuit board 64, and to form the second soldering portion 6112' in much the same way to the second electrode sheet 6111' and the second electrode 6412.

Please refer to FIGS. 5A and 5B. The flexible printed circuit board 64 can include a main portion 641, an upper winding arm 642, a lower winding arm 643. The first electrode 6411 and the second electrode 6412 are arranged apart at a distance from each other to be assembled on the main portion 641. At least a middle light emitting diode D51 is disposed between the first electrode 6411 and the second electrode 6412. Though the flexible printed circuit board 64 has been in a rolled form, it can be understood that once the flexible printed circuit board 64 is unfolded, the flexible printed circuit board 64 represents "I" letter form. The upper winding arm 642 is connected with several upper light emitting diodes D and the several upper light emitting diodes D are intervally arranged on the flexible printed circuit board 64. Please refer to FIG. 4F. The several light emitting diodes D can at least include a first upper light emitting diode D41, a second upper light emitting diode D42, a third upper light emitting diode D43, a fourth upper light emitting diode D44 and a fifth upper light emitting diode D45, and the quantity hereby is not limited thereto. The lower winding arm 643 can be connected with several light emitting diodes D spacedly arranged. The several light emitting diodes D can at least include a first lower light emitting diode D61, a second lower light emitting diode D62, a third lower light emitting diode (being derived from the third upper light emitting diode D43 in FIG. 4F by analogy), a fourth lower light emitting diode D64 and a fifth lower light emitting diode D65, and the quantity of the light emitting diodes mentioned here is not limited thereto.

In sum, though there are differences among the three aforementioned embodiments, the differences among them can be combined together to refine any one of the finished items derived from the embodiments and the basic structure as well as the appearance of the finished item would be represented as being shown in FIG. 3. Thus, the aforementioned technical features of the three embodiments are not independent to one another and any teaching from them can be combined across the three different embodiments to obtain hybridized results that should also be under protection. The present disclosure has the following advantages:

1. Protection to the light source module would be guaranteed more and the damages caused to the light source module that result from any external forces can be decreased.

2. The protection to the light source is reinforced, however sufficient light that ought to be released to the outside of the sphere body can be guaranteed.

3. The containing space for receiving the light source module is interconnected with the light releasing space of the groove and such structure only needs easy processes to fabricate and the costs of producing as well as the failure rate can also be lowered.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A light releasing sphere structure comprising:
a sphere body with a groove formed on a surface of the sphere body along a distribution path;
a light source module disposed in a containing space of the sphere body, wherein the groove is connected to the containing space to define a light releasing space and light emitted from the light source module passes through the light releasing space; and
a light guiding member filling to the light releasing space to allow the light emitted from the light source module to be distributed on the light guiding member along the distribution path and transmitted to outside of the sphere body;
wherein a cover layer is further included and the cover layer covers the sphere body, wherein a light transmissive region is distributed on a part of the cover layer along the distribution path; wherein the distribution path is of a baseball seam path, the light transmissive region is defined from a baseball seam, the baseball seam is distributed along the baseball seam path and the baseball seam path is seamed with a baseball suture.

2. The light releasing modified sphere structure according to claim 1, wherein the sphere body is partitioned into a first spherical surface and a second spherical surface; two end parts of the first spherical surface are respectively defined as a first expansion surface and a second expansion surface and a first narrow surface is defined between the first expansion surface and the second expansion surface, two terminals of the first narrow surface respectively connected to the first expansion surface and the second expansion surface; and
two end parts of the second spherical surface are respectively defined as a third expansion surface and a fourth expansion surface and a second narrow surface is defined between the third expansion surface and the fourth expansion surface, two terminals of the second narrow surface respectively connected to the third expansion surface and the fourth expansion surface.

3. The light releasing sphere structure according to claim 2, wherein the light source module comprises:
a luminescence column having a diameter decreased from an upper end of the luminescence column to a lower end of the luminescence column;
an upper thread portion connecting to the upper end of the luminescence column, the upper thread portion having a diameter decreased from an upper end of the upper thread portion to a lower end of the upper thread portion;
a lower thread portion connecting to a lower end of the luminescence column, the lower thread portion having a diameter decreased from an upper end of the lower thread portion to a lower end of the lower thread portion;
wherein a largest diameter of the luminescence column is smaller than a smallest diameter of the upper thread portion, and a largest diameter of the luminescence column is not larger than a smallest diameter of the upper thread portion.

4. The light releasing sphere structure according to claim 2, wherein the light source module comprises:
a cylinder having a diameter decreased from an upper end of the cylinder to a lower end of the cylinder;
an upper thread portion connecting to the upper end of the cylinder, the upper thread portion having a diameter decreased from the upper end of the upper thread portion to the lower end of the upper thread portion;
a lower thread portion connecting to the lower end of the cylinder, the lower thread portion having a diameter decreased from an upper end of the lower thread portion to a lower end of the lower thread portion; and a flexible printed circuit board having a circuit with several light emitting diodes electrically connected to the circuit, the flexible printed circuit board being laterally disposed on a first portion of an outer wall of the cylinder and electrically connected with a first electrode sheet and a second electrode sheet on the first portion, a battery installation space is opened on a second portion of the outer wall of the cylinder for being installed with a battery, the first electrode sheet and the second electrode sheet passing through the outer wall of the cylinder to extend to the battery installation space for electrically connecting to the battery, wherein a largest diameter of the cylinder with the flexible printed circuit board disposed thereon is smaller than a smallest diameter of the upper thread portion, and a smallest diameter of the cylinder with the flexible printed circuit board disposed thereon is smaller than a largest diameter of the lower thread portion, the largest diameter of the lower thread portion is not larger than the smallest diameter of the upper thread portion.

5. The light releasing sphere structure according to claim 4, wherein a first screw hole and a second screw hole are formed on the outer wall of the cylinder, the first screw hole and the second screw hole respectively corresponding to the first electrode sheet and the second electrode sheet, the first electrode sheet and the second electrode sheet respectively corresponding to a first electrode and a second electrode of the flexible printed circuit board, the flexible printed circuit board being fixed on the outer wall of the cylinder by a first screw set through the first electrode, the first electrode sheet and the first screw hole, and a second screw set through the second electrode, the second electrode sheet and the second screw hole.

6. The light releasing sphere structure according to claim 5, wherein the first screw and the second screw are respectively fixed by a first soldering portion and a second welding portion formed on an inner wall of the cylinder.

7. The light releasing sphere structure according to claim 4, wherein the flexible printed circuit board comprises:

a screw hole portion, the first electrode and the second electrode being arranged apart at a distance from each other and assembled on the screw hole portion, wherein two light emitting diodes side by side being disposed between the first electrode and the second electrode are respectively defined as a first middle light emitting diode and a second middle light emitting diode;

an upper winding arm with several light emitting diodes, wherein the several light emitting diodes at least comprise a first upper light emitting diode, a second upper light emitting diode, and a third upper light emitting diode; and a lower winding arm with several light emitting diodes, wherein the several light emitting diodes at least comprise a first lower light emitting diode, a second lower light emitting diode and a third lower light emitting diode.

8. The light releasing sphere structure according to claim 7, wherein the light releasing space in the groove close to the first expansion surface aside from the second narrow surface is defined as a second upper sub-space, and the groove at two sides of the first expansion surface is defined as a first upper sub-space and a third upper sub-space, the second upper light emitting diode, the first upper light emitting diode and the third upper light emitting diode respectively corresponds to the second upper sub-space, the first upper sub-space and the third upper sub-space.

9. The light releasing sphere structure according to claim 7, wherein the light releasing space at two sides of the first narrow surface are respectively defined as a first middle sub-space and a second middle sub-space, and the first middle sub-space and the second middle sub-space correspond to the first middle light emitting diode and the second middle light emitting diode.

10. The light releasing sphere structure according to claim 7, wherein the light releasing space in the groove at a side of the second narrow surface that is away from the first expansion surface is defined as a second lower sub-space, the light releasing spaces in the groove at two sides of the second expansion surface are respectively defined as a first lower sub-space and a third lower sub-space, and the second lower light emitting diode, the first lower light emitting diode and the third lower light emitting diode respectively correspond to the second lower sub-space, the first lower sub-space and the third lower sub-space.

11. The light releasing sphere structure according to claim 2, wherein the light source module comprises:

a cylinder;

an upper thread cap for blocking the upper end of the cylinder;

a flexible printed circuited board having a circuit with several light emitting diodes electrically connected to the circuit, the flexible printed circuit board being laterally disposed on a first portion of an outer wall of the cylinder, a battery installation space being opened on a second portion of the cylinder for being installed with a battery, wherein a first electrode sheet and a second electrode sheet passing through the outer wall of the cylinder to extend to the battery installation space, and the first electrode sheet and the second electrode sheet respectively connecting to a first electrode and a second electrode of the flexible printed circuit board, so as to allow the flexible printed circuit board to electrically connect to the battery, wherein a largest diameter of the cylinder with the flexible printed circuit board disposed thereon is smaller than a smallest diameter of the upper thread cap.

12. The light releasing sphere structure according to claim 11, wherein the first electrode sheet and the first electrode are fixed with a first soldering portion on the flexible printed circuit board; the second electrode sheet and the second electrode are fixed by a second soldering portion on the flexible printed circuit board.

13. The light releasing sphere structure according to claim 11, wherein the flexible printed circuit board comprises:

a main portion, wherein the first electrode and the second electrode are arranged apart at a distance from each other to be assembled on the main portion, and at least a middle light emitting diode is disposed between the first electrode and the second electrode;

an upper winding arm with several upper light emitting diodes, wherein the several upper light emitting diodes are intervally arranged.

14. The light releasing sphere structure according to claim 13, wherein the light releasing space in the groove close to the first expansion surface aside from the second narrow surface is defined as a second upper sub-space, and the groove at two sides of the first expansion surface is defined as a first upper sub-space and a third upper sub-space, the second upper light emitting diode, the first upper light emitting diode and the third upper light emitting diode respectively correspond to the second upper sub-space, the first upper sub-space and the third upper sub-space.

15. The light releasing sphere structure according to claim 13, wherein the light releasing space of the groove at two sides of the first narrow surface is defined as a first middle sub-space and a second middle sub-space, so as to allow the light emitted from the at least one middle light emitting diode to respectively pass through the first middle sub-space and the second middle sub-space to reach to the light guiding member.

16. The light releasing sphere structure according to claim 13, wherein the light releasing space of the groove at a side away from the first expansion surface is defined as a second lower sub-space, and the light releasing spaces of the groove at two sides of the second expansion surface are respectively defined as a first lower sub-space and a third lower sub-space, so as to allow the light emitted from the several lower light emitting diodes to respectively pass through the second lower sub-space, the first lower sub-space and the third lower sub-space to reach to the light guiding member.

\* \* \* \* \*